Jan. 5, 1971   A. SKROBISCH   3,553,619
ELECTRICALLY CONTROLLED MAGNETIC MOVEMENT
Filed Aug. 23, 1968

INVENTOR.
ALFRED SKROBISCH
BY
James and Franklin
ATTORNEYS

United States Patent Office 3,553,619
Patented Jan. 5, 1971

3,553,619
ELECTRICALLY CONTROLLED MAGNETIC
MOVEMENT
Alfred Skrobisch, Huntington Station, N.Y., assignor to
Allard Instrument Corporation, Westbury, N.Y., a corporation of New York
Filed Aug. 23, 1968, Ser. No. 754,873
Int. Cl. G08b 5/30; H01f 7/08, 7/14
U.S. Cl. 335—272
14 Claims

ABSTRACT OF THE DISCLOSURE

The electrically controlled magnetic movement comprises a permanent magnet acting as a rotor, and a stationary electromagnet or stator having three poles spaced around the rotor. Two poles of the opposite polarity are about 180° apart, and a third pole having the same polarity as one of the two poles is disposed about 90° from the first two poles. The rotor assumes a rest position between first two poles. When the electromagnet is energized the rotor turns abruptly with a snap action to a new position generally transverse to its rest position. This is done with greatly increased torque compared to previously known movements of the same general type. When the stator is again deenergized the rotor turns abruptly back to its original rest position, without need for a restoring spring. Stop means are effective to limit the rotation of the rotor to somewhat less than 90°.

---

In my Reissue Pat. 24,943 reissued Feb. 28, 1961 and entitled "Electrically Controlled Magnetic Movement" I describe a movement which may be used as an indicator instead of a pilot light, and for other purposes. Another such purpose is to move the segments of a segmented variable exhibitor, a cluster of seven such movements actuating seven segments for numeric display or readout. With the addition of further segments and magnetic movements the variable exhibitor may be made alphanumeric. Such devices are described in my Pat. 3,096,594 issued July 9, 1963 and entitled "Variable Exhibitor." The magnetic movements disclosed in the above patents employ a rotor disposed adjacent the poles of a stator having three poles. The torque exerted on the rotor by the stator is limited.

The present electrically controlled magnetic movement resembles the earlier movement in comprising a permanent magnet acting as a rotor, and a stationary electromagnet with a coil to temporarily but not permanently magnetize the same, there being three poles disposed around the rotor. The rotor may be a disc which is permanently magnetized diametrically. However, instead of having like polarity stator poles disposed diametrically magnetize the same, there being three poles disposed about 90° between the two like poles, the present device has two poles of opposite polarity which are disposed about 180° apart, and a third pole having the same polarity as one of the two poles is disposed about 90° from the said two poles of opposite polarity. When the electromagnet is not energized, the rotor assumes a rest position between the poles which are about 180° apart, that is, the poles which are unlike in polarity when the electromagnet is energized. When the electromagnet is energized the rotor turns abruptly with a snap action to a new position generally transverse to its rest position, where it remains for so long as the electromagnet is energized. It is turned with increased torque, say two to three times the torque previously provided. When the stator is deenergized the rotor turns abruptly back to its original rest position. This is done without need for a restoring spring. The device is provided with stop means effective to limit the rotation of the rotor to less than 90° say 65° or 70°. The two limits of motion are so located as to keep one pole of the rotor between the two unlike poles of the stator.

More specifically, the magnetic movement in its combination comprises a permanent magnet having two poles of opposed polarity disposed about 180° apart acting as a rotor, means mounting the same for rotation, a stationary electromagnet having a core made of a material which may be temporarily but not permanently magnetized, a coil to magnetize the same, said core when magnetized having three poles disposed around the rotor, two poles of opposite polarity being disposed about 180° apart, and a third pole having the same polarity as one of the two poles being disposed about 90° from the said two poles, and stop means effective to limit the rotation of the rotor to less than 90°, one limit of the stop means being so located as to position a pole of the rotor in a rest position adjacent a similar pole of the electromagnet and between two unlike poles of the electromagnet, and the other limit of the stop means being so located as to position said pole of the rotor in an energized position adjacent an unlike pole of the electromagnet and between said two unlike poles of the electromagnet.

The stator or stationary magnet may comprise two pieces of strap metal and a rod, the energizing coil being disposed on the rod, and the two pieces of strap metal being secured to opposite ends of the rod. One piece is bent to form two like-polarity poles disposed about 90° apart, and the other piece is bent to form a third pole which is disposed about 90° from one of the two like poles. In this structure, the axis of rotation of the rotor is generally perpendicular to the axis of the rod and coil.

However, in another form the axis of rotation may be made to coincide with the axis of the rod and coil.

The foregoing and additional features are described in the following detailed specification, which is accompanied by drawings in which.

Figure 3:
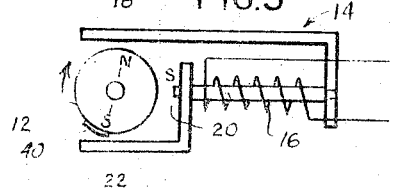
FIG. 3 is a somewhat schematic elevation showing the relation between the rotor and stator when the stator is deenergized.

Referring to the drawing, and more particularly to FIG. 3, the electrically controlled magnetic movement comprises a permanent magnet 12 acting as a rotor, and a stationary electromagnet generally designated 14, this having a core made of soft iron or other ferrous material which may be temporarily but not permanently magnetized. There is a soil 16 to magnetize the stator. The stator has three poles 18, 20 and 22 disposed around the rotor 12. With the coil 16 deenergized the rotor 12 assumes a normal or rest position, which is generally upright as viewed in the drawing. Differently expressed, the permanent magnet 12 turns to its "keeper" position, with its poles attracted to the ferrous parts of the core shown at the top and bottom of the rotor.

Figure 4:
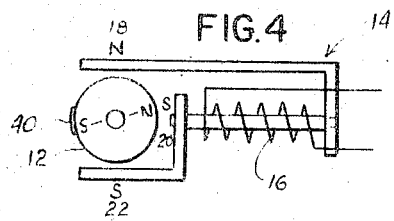
FIG. 4 is a similar view showing their relation when the stator is energized.

When the coil is energized the parts assume the relation shown in FIG. 4, there being two poles 18 and 22 of opposite polarity disposed about 180° apart, and a third pole 20 having the same polarity as the pole 22, and being disposed about 90° from the poles 18 and 22. In FIG. 4 the two like poles are indicated to be south poles and the top pole is shown to be a north pole. The north pole of the rotor is repelled by north pole 18 and is attracted by the south pole 20, and the south pole of the rotor is repelled by the south pole 22. All forces are additive.

In the prior construction shown in Pats. Re. 24,943 and No. 3,096,594 the rotor north would similarly be repelled by the stator north and attracted by the stator south, but the movement would be resisted by the attraction of the other stator north for the rotor south. The torque was reduced rather than increased by the second of the two poles of like polarity. The terms "north" and "south" are used for clarity, but may be reversed.

Figure 1:
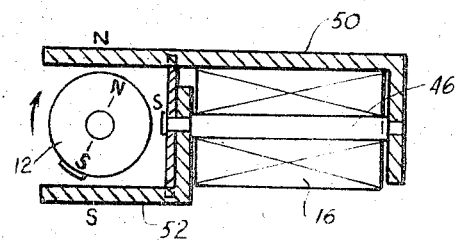
FIG. 1 is a section through an electrically controlled magnetic movement embodying features of the invention.
Figure 2:
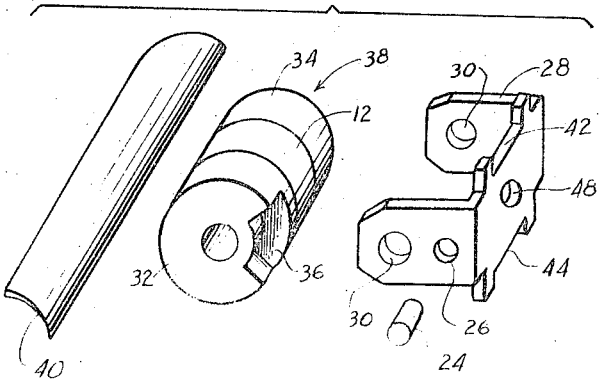
FIG. 2 is a perspective view showing parts located at the rotor, including a segment of a variable exhibitor.
Figure 5:
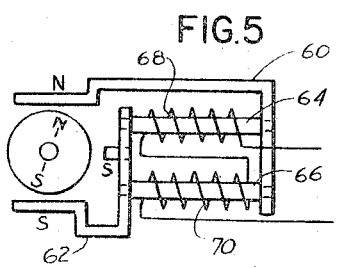
FIG. 5 is a similar view showing a modification having two coils.

In the present construction, the rotor permanent magnet 12 has its two poles N and S of opposed polarity disposed about 180° apart. The core of the stationary electromagnet 14 when magnetized has the three poles 18, 20 and 22 disposed around the rotor, two poles 18 and 22 of opposite polarity N and S being disposed about 180° apart, and a third pole 20 having the same polarity S as one of the said two poles, namely the pole 22, disposed about 90° from the said two poles 18 and 22. Stop means described below with reference to FIG. 2 is effective to limit the rotation of the rotor to less than 90°, one limit of the stop means being so located as to position a pole of the rotor, namely the pole N in a rest position adjacent the similar pole N of the electromagnet and between the two unlike poles N and S of the electromagnet, as shown in FIGS. 1, 3 and 5 of the drawings, and the other limit of the stop means being so located as to position the pole N of the rotor in an energized position adjacent an unlike pole S of the electromagnet and again between the two unlike poles N and S of the electromagnet, as shown in FIG. 4 of the drawings.

If the current supply to the coil is gradually increased from zero, the rotor does not turn proportionately. Instead it remains in the rest position shown in FIG. 3 until the current reaches a critical value, whereupon the rotor snaps around abruptly to the energized position shown in FIG. 4. If the current is decreased gradually the opposite condition prevails, that is, the rotor remains in the energized position shown until the current falls below a critical value, whereupon the rotor snaps back with a snap action to a rest position shown in FIG. 3.

To insure and improve this snap action, the motion of the rotor is preferably limited to somewhat less than 90°, say to 65° or 70°. Such an arrangement is indicated in FIG. 2, in which the rotor 12 is cut away for cooperation with a fixed stop pin 24 driven into a hole 26 in a U-shaped member 28, having bearing holes 30 for a non-magnetic pin (not shown) which passes through the rotor. The member 28 may be made of brass or other non-ferrous metal, or may be molded out of a suitable plastics material such as nylon.

As explained in my earlier patents, the permanent magnet 12 could be a bar magnet but preferably is a disc which is diametrically magnetized, as shown at 12, and this may be enlarged in axial direction by the addition of non-magnetic ends 32 and 34 adhered to the disc 12 to provide a rotor of cylindrical configuration. The part 36 which is cut away from the rotor may be located in the non-magnetic section 32, and limits the rotation to substantially less than 90°.

For an indicator used in lieu of a pilot light, a part of the cylinder 38 may be coated white, and another part black or red, for contrast. When used in a variable exhibitor, a slender lightweight strip 40 (FIG. 2) may be secured to the cylinder 38. FIG. 3 shows how this strip is retracted or out of sight when the device is deenergized, and FIG. 4 shows how the rotor and/or flag 40 is in visible position when the stator is energized.

It will be understood that the bearing yoke 28 shown in FIG. 2 is made of non-magnetic material; that the top and bottom straps of the stator core may be received in top and bottom notches 42 and 44 of yoke 28; and that the forward end of rod 46 (FIG. 1) passing through the coil 16 is received in the hole 48 (FIG. 2). In FIG. 1 the stationary magnet comprises a long L-shaped piece of strap metal 50, a short L-shaped piece 52, and a round rod 46 which receives the coil 16. The piece 52 is secured to one end of the rod 46, and the piece 50 is secured to the other end of the rod 46. The short piece 52 provides one of the poles of like polarity, and the end of the rod 46 protruding through part 52 provides the other pole of like polarity. The long piece 50 provides the single pole of opposite polarity.

A different form of stator is shown in FIG. 5, but in this case there are two coils, so that the physical structure may be shortened somewhat, and here there are two pieces of strap metal 60 and 62, and two rods 64 and 66 which receive the two coils 68 and 70. The longer piece 60 is secured to the rear ends of the rods 64 and 66, and the shorter piece 62 is secured to the forward ends of the rods 64 and 66. Piece 62 is shaped to form one of the poles of like polarity and to hold the small projection marked S which acts as the other pole of like polarity. These poles are about 90° apart. The other piece 60 is shaped to form a third pole which is disposed about 90° away from the nearer of the two like poles.

Figure 6:
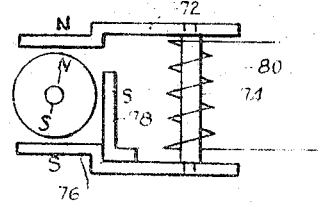
FIG. 6 shows a modification which may be used when the magnetic movement must be limited in length.

Another form of stator is shown in FIG. 6, and here again the core comprises a piece of strap metal 72 secured to one end of rod 74, another piece of strap metal 76 secured to the other end of rod 74. An extra pole piece 78 is secured to piece 76, as by welding. One main change is that rod 74 and its surrounding coil 80 are vertical instead of horizontal. This makes possible further shortening of the structure. The piece 76, 78 secured to one end of the rod provides the two like polarity poles disposed about 90° apart, and the piece 72 provides a third pole disposed about 90° from the pole 78.

Figure 7:
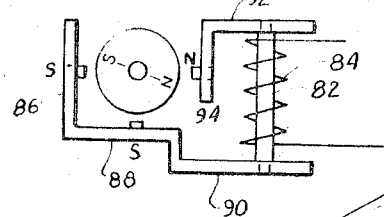
FIG. 7 is a similar view showing still another arrangement of the stator.

Another form of stator is illustrated in FIG. 7. In this case the rod 82 and its coil 84 are upright. The lower piece of strap metal 90 has parts 86 and 88 which provide the two like poles which are disposed about 90° apart. The extension 90 is secured to one end of the rod 80, and the other piece 92 is secured to the upper end of rod 82 and provides the third pole 94, which is of opposite polarity to the poles 86 and 88, and which is disposed about 90° away from the pole 88.

FIG. 7 also illustrates the use of tips or projections to form more concentrated local poles, but this refinement is not at all necessary.

As so far described the axis of rotation of the rotor is generally perpendicular to the axis of the coil and the rod receiving the same. However, if desired the axis of rotation may be made to parallel and even coincide with the axis of the rod and coil, and such an arrangement is shown in FIGS. 8 through 11 of the drawing.

Figure 8:
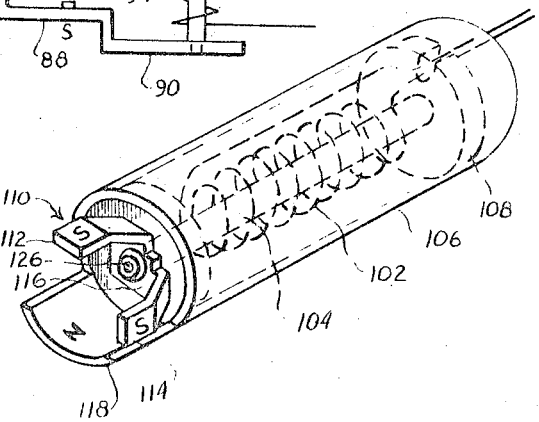
FIG. 8 is a perspective view showing a modified stator which may be used when the rotor is to be coaxial with the coil.

Referring to FIG. 8, a coil 102 is disposed on a core rod 104 concentrically within a hollow cylinder 106. The rear end of rod 104 is secured to a disc 108 received in the rear end of the cylinder.

The forward end of the rod 104 is riveted to an angle pole piece 110. This provides like poles 112 and 114 joined by a part 116 which is secured to the forward end of the rod 104. The forward end of the cylinder 106 is largely cut away, leaving only a part of 118 which acts as one pole of the stator. The parts 104, 106, 108, are all ferrous, that is, they are magnetizable but not permanently magnetizable.

Figure 9:
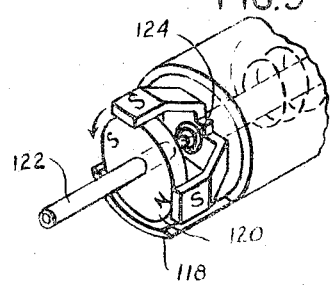
FIG. 9 shows the disposition of the rotor in the stator of FIG. 8.

Referring now to FIG. 9, the rotor or diametrically magnetized disc 120 is mounted on a non-magnetic tube or sleeve 122 which is received over a bearing pin 124. The latter may be received in a hole in the core rod 104, this hole being indicated at 126 in FIG. 8. The forward projecting part of sleeve 122 (FIG. 9) may be used to carry an indicator disc or vane or flag, depending on what the magnetic movement is designed to do.

Figure 10:
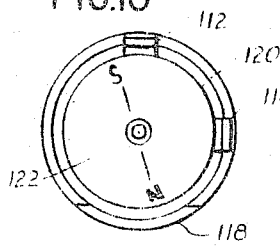
FIG. 10 is an end view showing the rest position of the rotor.
Figure 11:
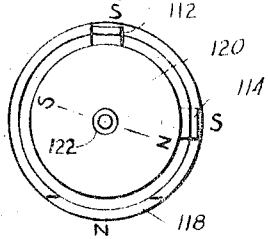
FIG. 11 is a similar view showing the position of the rotor when the stator is energized.

The operation will be understood from inspection of FIGS. 10 and 11. Here again the motion is limited by appropriate stop means to somewhat less than 90°, say 70°. The rest or keeper position with the electromagnet deenergized is shown in FIG. 10. At this time the permanent magnet 120 positions itself between the ferrous but non-magnetized parts 112 and 118. When the electromagnet is energized the rotor 120 snaps to the position shown in FIG. 11, the north pole being repelled by pole 118 and being attracted to the south pole 114, and the south pole of the rotor being repelled by the south pole 112 of the stator.

It is believed that the construction and operation of my improved electrically controlled magnetic movement, as well as the advantages thereof, will be apparent in the foregoing description. The increased torque makes it possible to move a larger flag or other such element, and conversely, for the same size flag a much smaller magnetic movement will suffice. This is important with the modern trend to miniaturization.

It will be understood that while I have shown and described the invention in several forms, changes may be made without departing from the scope of the invention.

I claim:

1. An electrically controlled magnetic movement comprising a permanent magnet having two poles of opposed polarity disposed about 180° apart acting as a rotor, means mounting the same for rotation, a stationary electromagnet having a core made of a material which may be temporarily but not permanently magnetized, a coil to magnetize the same, said core when magnetized having three poles disposed around the rotor, two poles of opposite polarity being disposed about 180° apart, and a third pole having the same polarity as one of the two poles being disposed about 90° from the said two poles, and stop means effective to limit the rotation of the rotor to less than 90°, one limit of the stop means being so located as to position a pole of the rotor in a rest position adjacent a similar pole of the electromagnet and between two unlike poles of the electromagnet, and the other limit of the stop means being so located as to position said pole of the rotor in an energized position adjacent an unlike pole of the electromagnet and between said two unlike poles of the electromagnet.

2. A magnetic movement as defined in claim 1 in which the rotor returns abruptly to rest position when the electromagnet is deenergized, without need for a restoring spring.

3. A magnetic movement as defined in claim 2 in which the rotor is a disc which is permanently magnetized diametrically.

4. A magnetic movement as defined in claim 3 in which the core of the stationary magnet comprises two pieces of strap metal and a rod, and an energizing coil on the rod, said two pieces of strap metal being secured to opposite ends of the rod, one piece being shaped to form two like-polarity poles disposed about 90° apart, and the other piece being shaped to form a third pole which is disposed about 90° apart from one of the two like poles.

5. A magnetic movement as defined in claim 3 in which the stationary magnet comprises a long L-shaped piece of strap metal, a short L-shaped piece of strap metal, a round rod, and an energizing coil for the electromagnet disposed around the rod, the short L-shaped piece being secured to one end of the rod, the long L-shaped piece being secured to the other end of the rod, the short L-shaped piece providing the two like-polarity poles, and the long L-shaped piece providing a third pole of opposite polarity.

6. A magnetic movement as defined in claim 4 in which the stop means is effective to limit the rotation of the rotor to less than 90°, say to 70°, and in which the said two limits are so located as to keep said pole of the rotor between the two unlike poles of the electromagnet.

7. A magnetic movement as defined in claim 6 in which the axis of rotation of the rotor is generally perpendicular to the axis of the rod and coil.

8. A magnetic movement as defined in claim 6 in which the axis of rotation of the rotor substantially coincides with the axis of the rod and coil.

9. A magnetic movement as defined in claim 1 in which the rotor is a disc which is permanently magnetized diametrically.

10. A magnetic movement as defined in claim 1 in which the core of the stationary magnet comprises two pieces of strap metal and a rod, and an energizing coil on the rod, said two pieces of strap metal being secured to opposite ends of the rod, one piece being bent to form two like-polarity poles disposed about 90° apart, and the other piece being bent to form a third pole which is disposed about 90° apart from one of the two like poles.

11. A magnetic movement as defined in claim 1 in which the stationary magnet comprises a long L-shaped piece of strap metal, a short L-shaped piece of strap metal, a round rod, and an energizing coil for the electromagnet disposed around the rod, the short L-shaped piece being secured to one end of the rod, the long L-shaped piece being secured to the other end of the rod, the short L-shaped piece providing the two like-polarity poles, and the long L-shaped piece providing a third pole of opposite polarity.

12. A magnetic movement as defined in claim 1 in which the stop means is effective to limit the rotation of the rotor to less than 90°, say to 70°, and in which the said two limits are so located as to keep said pole of the rotor between the two unlike poles.

13. A magnetic movement as defined in claim 1 in which the axis of rotation of the rotor is perpendicular to the axis of the rod and coil.

14. A magnetic movement as defined in claim 1 in which the axis of rotation of the rotor substantially coincides with the axis of the rod and coil.

References Cited

UNITED STATES PATENTS

| 3,309,696 | 3/1967 | Alster et al. | 335—234X |
| 3,096,594 | 7/1963 | Skrobisch | 40—52X |
| 3,025,512 | 3/1962 | Bloechl | 340—373 |
| Re 24,943 | 2/1961 | Skrobisch | 335—227X |

FOREIGN PATENTS

| 164,028 | 9/1933 | Switzerland | 335—272 |

BERNARD A. GILHEANY, Primary Examiner

D. M. MORGAN, Assistant Examiner

U.S. Cl. X.R.

340—373